United States Patent [19]
Liu et al.

[11] Patent Number: 6,049,336
[45] Date of Patent: Apr. 11, 2000

[54] TRANSITION ANIMATION FOR MENU STRUCTURE

[75] Inventors: Chris Shi-Chai Liu, San Jose; Bryan Lew Fong, San Diego, both of Calif.; Kazuto Mugura, Kawasaki, Japan

[73] Assignees: Sony Corporation, Tokyo, Japan; Sony Electronics Inc., Park Ridge, N.J.

[21] Appl. No.: 09/133,025

[22] Filed: Aug. 12, 1998

[51] Int. Cl.[7] .................................................. G06F 3/00
[52] U.S. Cl. ........................ 345/353; 345/341; 345/357
[58] Field of Search .................................. 345/341, 350, 345/352, 353, 356, 357

[56] References Cited

U.S. PATENT DOCUMENTS

| | | | |
|---|---|---|---|
| 5,305,435 | 4/1994 | Bronson | 345/356 X |
| 5,644,737 | 7/1997 | Tuniman et al. | 345/352 |
| 5,657,049 | 8/1997 | Ludolph et al. | 345/348 |
| 5,675,752 | 10/1997 | Scott et al. | 345/333 |
| 5,694,563 | 12/1997 | Belfiore et al. | 345/352 |
| 5,856,827 | 1/1999 | Sudo | 345/352 |
| 5,892,475 | 4/1999 | Palatsi | 345/352 |
| 5,914,717 | 6/1999 | Kleewein et al. | 345/352 |
| 5,923,327 | 7/1999 | Smith et al. | 345/341 |

*Primary Examiner*—Raymond J. Bayerl
*Assistant Examiner*—Chadwick A Jackson
*Attorney, Agent, or Firm*—Philip M. Shaw, Jr.; Crosby, Heafey, Roach & May

[57] ABSTRACT

Graphical User Interfaces (GUIs) are routinely used to provide visual interfaces between applications and users. Typically, a GUI displays on a screen a menu containing a plurality of menu items. A new menu may be invoked by selecting one of the menu items from the screen. Unfortunately, available GUIs do not provide satisfactory continuity in the transition from a current menu to a subsequent menu. To overcome the shortcomings of the available art, an improved GUI provides an animation in the transition from a current menu to a subsequent menu. Specifically, after a menu item has been selected from a display screen, the selected menu item is continuously moved to the top position of the display screen, while the menu selection is being processed. In the meantime, the subsequent menu items resulting from the menu selection are continuously moved into the display screen.

30 Claims, 6 Drawing Sheets

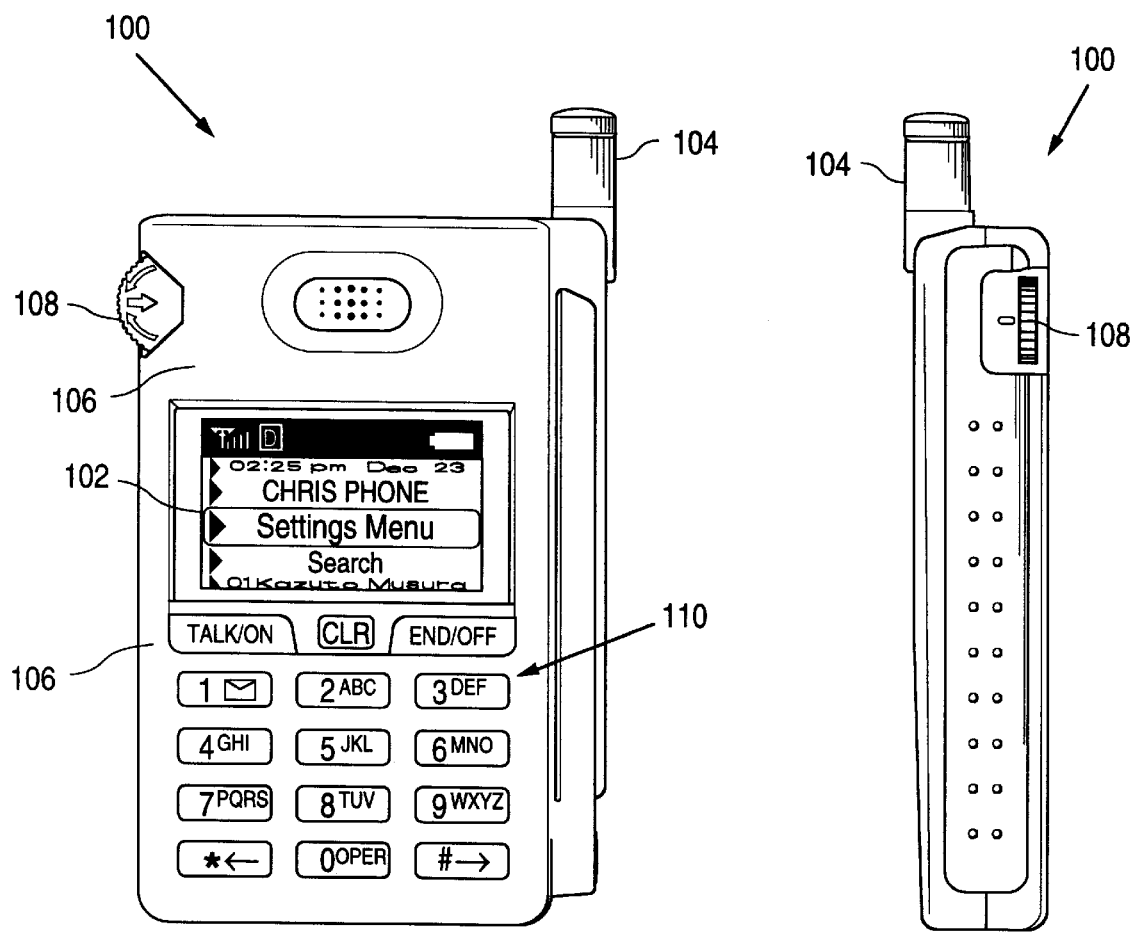
FIG. 1A　　FIG. 1B
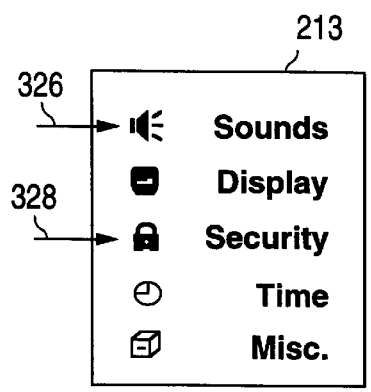
FIG. 3

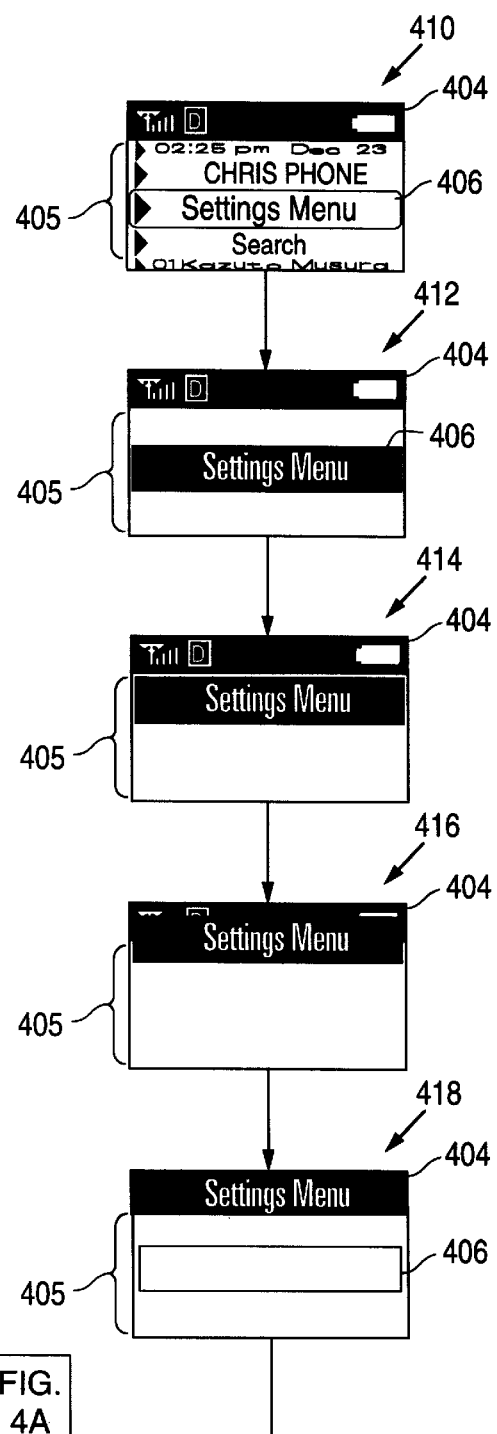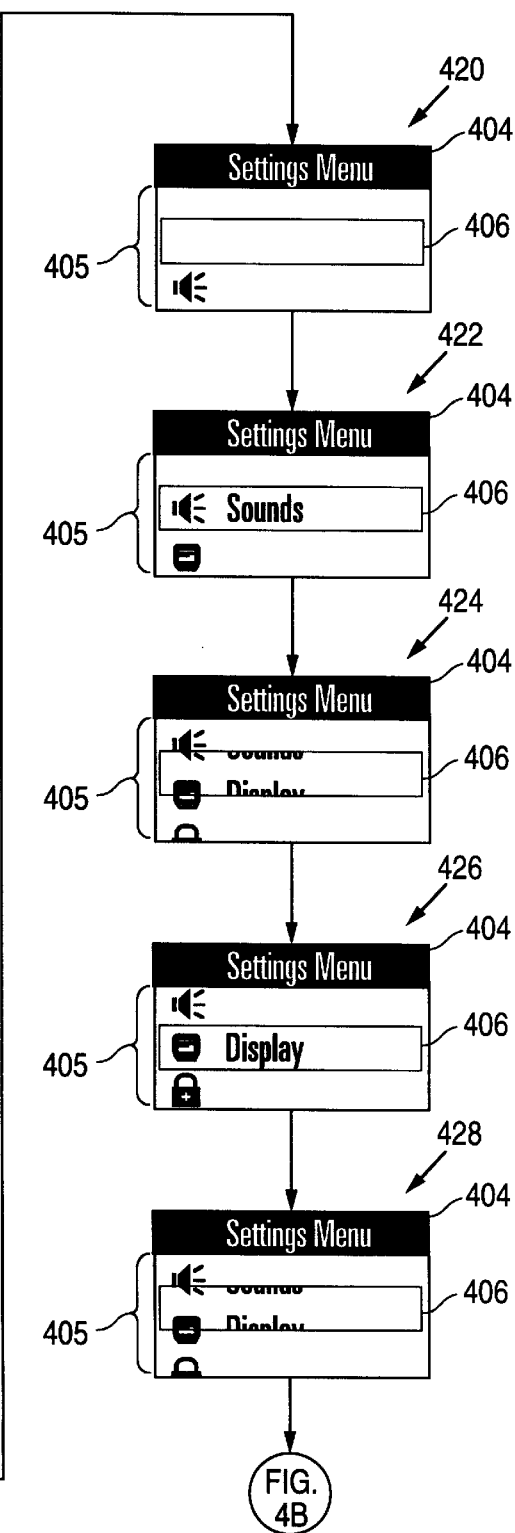
FIG. 4A

TRANSITION ANIMATION FOR MENU STRUCTURE

BACKGROUND OF THE INVENTION

1. Field of the Invention

This invention relates generally to Graphical User Interfaces, and, more specifically, to the Graphical User Interfaces containing a plurality of menu items, each of them possibly containing a plurality of sub menu items.

2. Related Art

Graphical User Interfaces (GUIs) are routinely used to provide visual interfaces between applications and users. Displayed on a screen, a GUI typically provides a menu containing a plurality of menu items. In response to a selection of a menu item, the GUI erases the menu and displays a respective sub menu on the screen. The sub menu may further contain a plurality of sub menu items. By selecting a sub menu item, a user can invoke an application or input parameters for running an application. After executing the application, the GUI retrieves the result from the application and displays it on the screen for the user.

Unfortunately, available GUIs do not provide satisfactory continuity in the transition from a current menu to a subsequent menu. Typically, after a user has selected a menu item from a current menu displayed on a screen, the current menu either statically remains on or disappears from the screen while the menu selection is being processed. Waiting for a subsequent menu or a result to be displayed without knowing the processing status of the menu selection can cause user anxieties. Specifically, the processing times for different menu items vary. Without effective transitional image or information on a screen when a menu selection is being processed, a user cannot be certain about the expected waiting time. To compound the anxieties, a user may make a wrong selection, which takes a longer time to wait for an error message. It is also possible some problems may have occurred in the hardware or software of the system running the GUI, which even takes a much longer time to wait for an error message. Therefore, in waiting for a subsequent display resulting from a menu selection, a user may frequently hesitate to wait for the subsequent display or abort the previous menu selection.

One available solution to providing menu display continuity is to display a sand-glass icon to prompt the user that a selected menu item is in processing. However, this solution is disruptive to a user, because it requires the user to observe an icon separate from the menu from which a menu item was selected.

Another available solution to providing menu display continuity is to display a blank rectangular bar. While a selected menu item is in processing, the rectangular bar is being filed with shades showing the completion percentage of the processing. However, this solution is not suitable where the completion percentage of processing a selected menu item cannot be measured.

In addition, these two solutions described above will not be feasible in the situation where a GUI is displayed on a relatively small region, such as the LCD screen on a cellular telephone.

There is, therefore, a need for a method and apparatus to provide satisfactory continuity in the transition from a menu to another.

There is another need for a method and apparatus to provide satisfactory continuity in the transition from a menu to another on a relative small display region.

The present invention provides methods and apparatuses to meet these two needs.

SUMMARY OF THE INVENTION

To address the shortcomings of the available art, the present invention provides novel methods for changing user menus and menu items.

In one aspect, the present invention provides a method which comprises the steps of:

- displaying a screen having a menu title region and a display region;
- displaying at least one menu item in the display region, the menu item containing a plurality of sub menu items;
- activating the menu item;
- continuously moving the activated menu item to the menu title region; and
- continuously moving the sub menu items into the display region while the activated menu item is being moved toward the menu title region.

In another aspect, the present invention provides a method which comprises the steps of:

- displaying a screen having a menu title region and a display region;
- displaying in the display region a first level menu containing a plurality of first level menu items;
- displaying an associated icon beside each of the first level menu items;
- activating one of the plurality of first level menu items, the activated first level menu item containing at least one second level menu item;
- continuously moving the activated first level menu item and an icon associated with the activated first menu item to the menu title region;
- continuously moving the second level menu item associated with the activated first level menu item into the display region while the activated first level menu item is being moved toward the menu title region.

In still another aspect, the present invention provides a method for displaying a tag containing a tag head and a message. The method comprises the step of:

- displaying a screen;
- displaying the tag head in the screen;
- activating the tag;
- continuously moving the tag head to a top position of the screen; and
- continuously moving the message into the screen while the tag head is being moved towards the top position of the screen.

The present invention also provides apparatuses for performing the methods described above.

The foregoing and other features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1A is the front view of a cellular telephone, which can be used to implement the present invention;

FIG. 1B is the side view of a cellular telephone shown in FIG. 1A;

FIG. 3 shows a menu item output buffer containing five menu items;

DETAILED DESCRIPTION OF THE PREFERRED EMBODIMENTS

Figure 2:
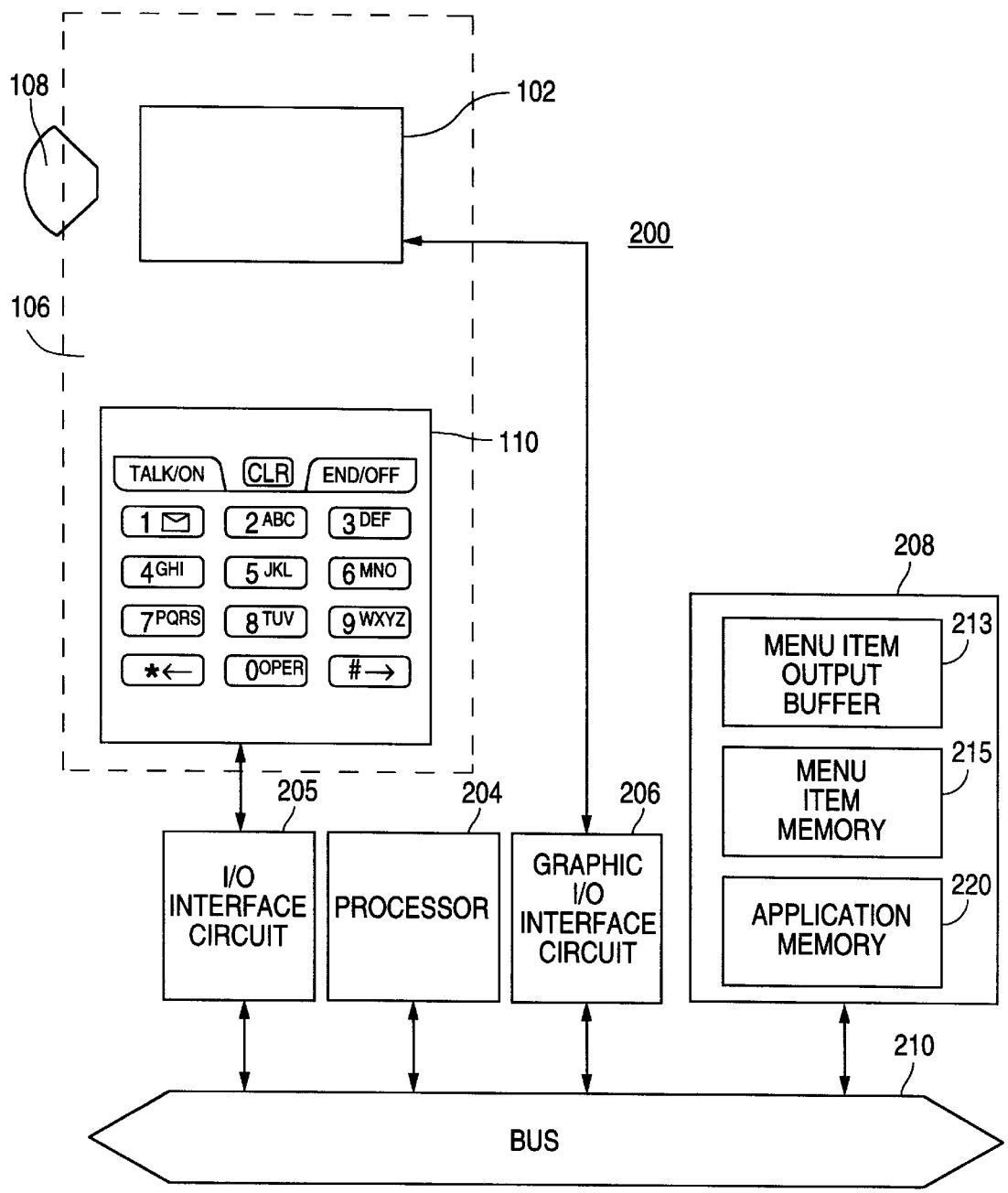
FIG. 2 is a block diagram illustrating some components of the cellular telephone, in accordance with the present invention.

Referring to FIG. 1A, there is shown the front view of i cellular telephone 100, which can be used to implement the present invention.

As shown in FIG. 1A, the cellular telephone 100 includes a display screen 102, an antenna 104, and a control panel 106. The control panel 106 includes a jog dial wheel 108 and a key panel 110 including twelve alpha/numeric keys (1, 2, 3, 4, 5, 6, 7, 8, 9, *, 0, and #). The jog dial wheel 108 can be moved in three directions (turn-up, turn-down, and press-in) as indicated by the three arrows. The items displayed on the display screen 102 can be scrolled up and down by turning the jog dial wheel 108 up and down, respectively. A selected item displayed on the display screen 102 can be activated by pressing-in the jog dial wheel 102.

Referring to FIG. 1B, there is shown the side view of the cellular telephone 100 to illustrate the side view of the jog dial wheel 108.

Referring to FIG. 2, there is shown a block diagram 200, illustrating some components of the cellular telephone 100 shown in FIG. 1A, in accordance with the present invention. The block diagram 200 includes a processor 204, an I/O (input and output) interface circuit 205, a graphic I/O interface circuit 206, a memory 208, and a bus 210. The processor 204, the I/O interface circuit 205, the graphic I/O interface circuit 206, and the memory 208 are all coupled to the bus 210.

The memory 208 includes: (1) a menu item output buffer 213 for storing menu items to be displayed, (2) a menu memory 215 for storing all menu items, and (3) an application memory 220 for storing an application including a data entry routine and a (telephone) sound setting routine.

The processor 204 controls the operations of the I/O interface circuit 205, the graphic the I/O interface circuit 206, the memory 208, and the display region 102. More specifically, the processor 204 is able to: (1) get access to the data stored in the menu item output buffer 213 and the menu memory 215, (2) execute the application stored in the application memory 220, (3) interact with the control panel 106 via the I/O interface circuit 205, and (4) display the data stored in the menu output buffers 213 on the display region 102 via the graphic I/O interface circuit 206. All of these operations are performed in a conventional manner, except as otherwise described herein. See for example, U.S. Pat. No. 5,856,827 (Sudo).

Since to the cellular system 100, the display region 102 is an output mechanism, the menu output buffer 213 is especially set to store the menu items for the display region 102. Since the display region 102 has a relatively small area, not all the menu items stored in the menu item output buffer 213 can be displayed on the display region 102 at a certain point of time. Hence, a start pointer and an end pointer are set to mark an active section for the menu item output buffer 213. Even though all the menu items stored in the menu item output buffer 213 are linked with the display region 102, only the menu items contained in the active section are proportionally displayed on the display region 102 at a certain point of time. When the start and end pointers move up or down by turning up or down the jog dial wheel 108 on the control panel 106, the active section of the menu item output buffer 213 is also being moved up or down, causing the menu items stored in the menu item output buffer 213 to scroll up or down on the displaying region 102 accordingly.

Referring to FIG. 3, there is shown the menu output buffer 213 containing five menu items in a Settings Menu. Each of the five menu items contains two fields, a content field and an icon field associated with the content field. As shown in FIG. 3, a start pointer 326 is set to the first menu item (Sounds), and an end pointer 328 is set to the third menu item (Security), thus marking an active section of the menu output buffer 213 containing three menu items (Sounds, Display, Security, and their respective icons).

Figure 4B:
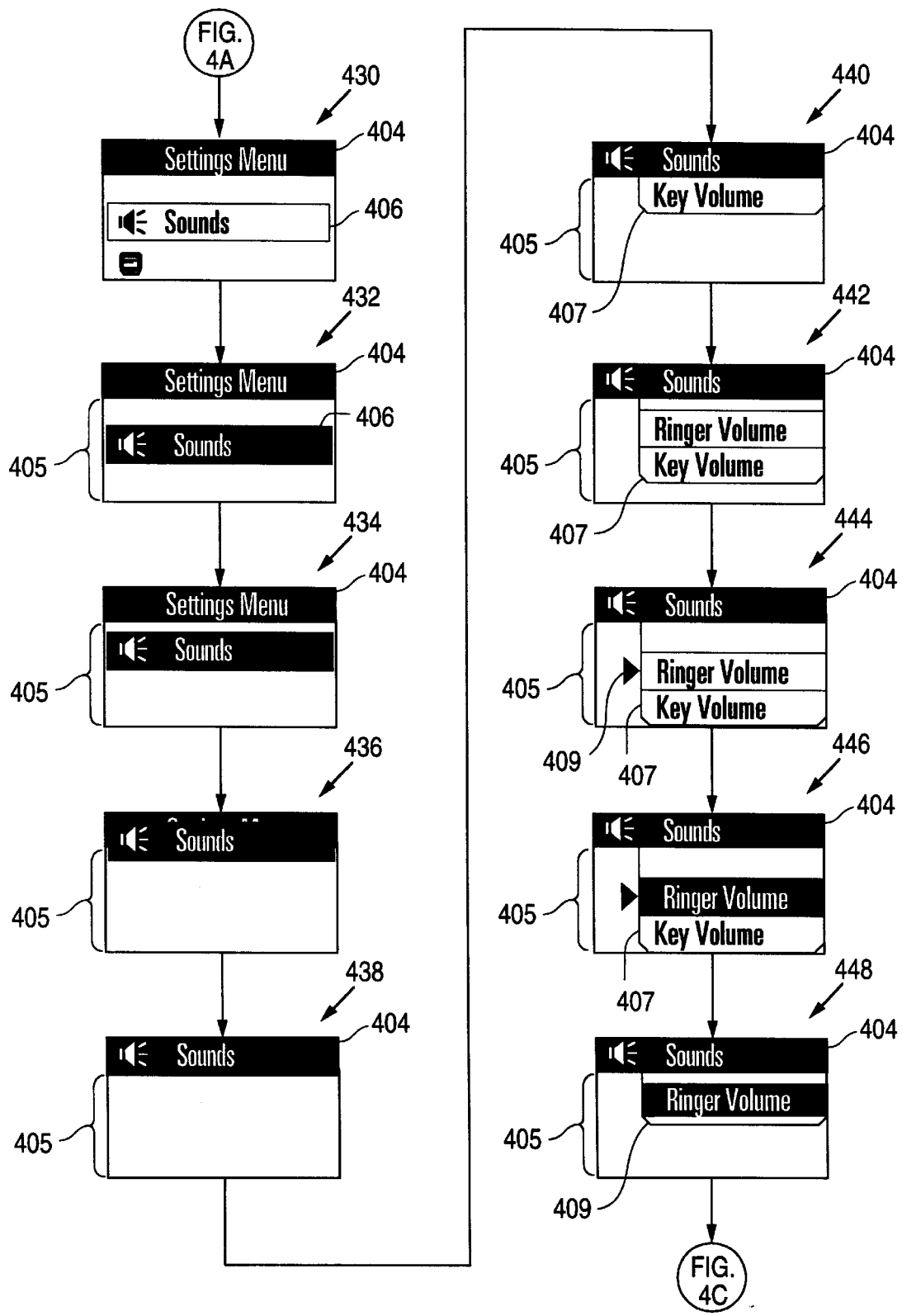
FIG. 4 (comprised of 4A–4C) shows the steps of illustrating animation transition effects for menu items on a display region, in accordance with one embodiment of the present invention.
Figure 4C:
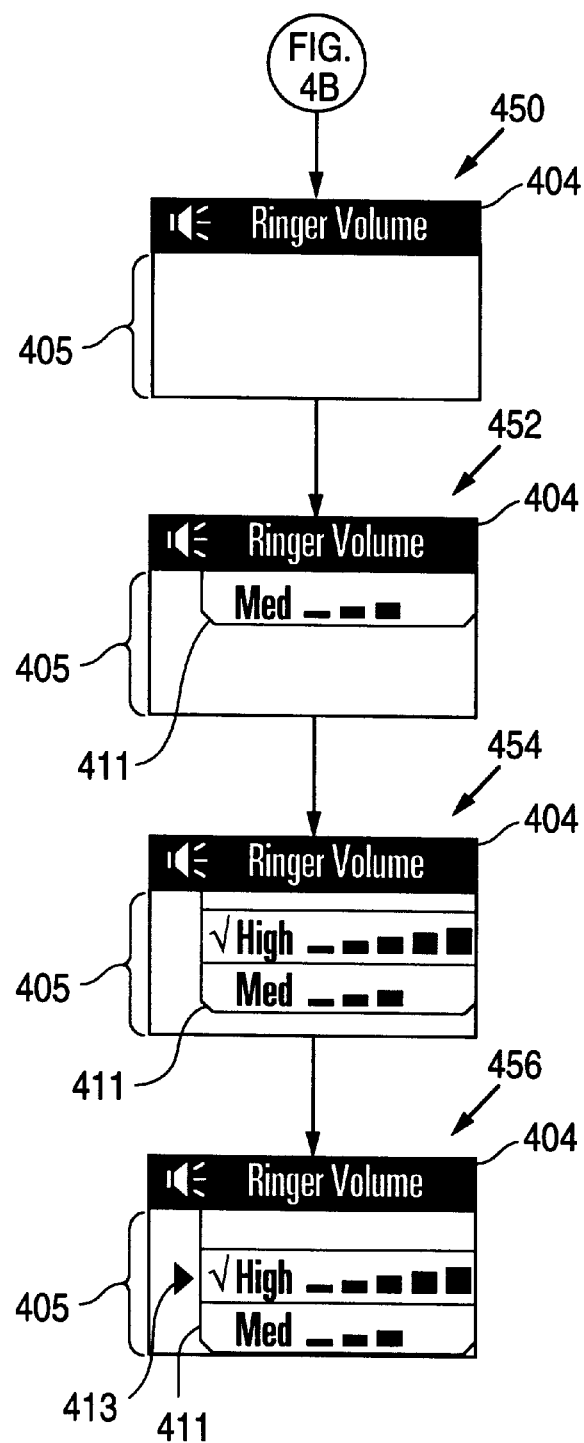

Referring to FIG. 4 (comprise of 4A–4C), there are shown the steps of illustrating animation transition effects for menu items on the display region 102, in accordance with one embodiment of the present invention.

At step 410, the processor 204 executes the display routine (stored in the application memory 220) to display a main user menu. As shown in step 410, the main user menu contains a title region 404 at the top of the main user menu and a menu region 405 having a rectangular box 406 in the middle of the menu region 405. The menu item contained in the rectangular box 406 can be invoked by pressing-in the jog dial wheel 108. In the example shown at step 410, a "Settings Menu" is displayed in the rectangular box 406. At this time, the text in the menu region 405 is displayed as solid letters over a normal (e.g. light) background.

At step 412, to invoke the "Settings Menu", a user presses-in the jog dial wheel 108. In response, the control panel 106 sends a request to the processor 204 via the I/O interface circuit 205. In response to the request, the processor 204 executes the display routine to invert the text (Settings Menu) in the rectangular box 406, so that the text in the rectangular box 406 is displayed as hollow letters over a solid (e.g. highlighted) background. At the same time, the processor 204 executes the display routine to erase the other text in the menu region 405. By inverting the text of the rectangular box 406 and erasing the other text, the user can easily recognize that the menu selection is in processing.

At steps 414 and 416, the processor 204 executes the display routine to continuously move the Settings Menu contained in the rectangular box 406 upwards to the title region 404.

At step 418, the processor 204 moves the Settings Menu to the title region 404 and maintains the Settings Menu in the title region 404. At this time, the processor 204 re-displays the rectangular box 406 in middle of the menu region 405.

At steps 420–426, the processor 204 executes the display routine to scroll the three menu items (Sounds, Display, Security and their respective icons) stored in the active section of the menu item output buffer 213 into the menu region 405. In the process of scrolling the three menu items, the icon fields of the menu items are displayed in the menu item region 405 once they have been scrolled into the region 405. However, the content fields of the menu items are displayed only when they have been scrolled into the rectangular box 406. Such a display scheme facilitates a user to locate and select a particular menu item of interest.

At step 420, the processor 204 executes the display routine to scroll the "Sounds" menu item upwards into the menu region 405. Since the "Sound" menu item has not moved into the rectangular box 406, only the icon field of the "Sounds" menu item is displayed at the bottom of the menu region 406.

At step 422, the processor 204 executes the display routine to scroll the "Display" menu item into the menu region 405 and the "Sounds" menu item into the rectangular box 406. Since the "Sounds" menu item has been moved into the rectangular box 406, both the icon field and content field of the "Sounds" menu item are displayed in the rectangular box 406.

At step 424, the processor 204 executes the display routine to scroll the "Sounds" menu item into the first line of the menu region 405, the "Display" menu item into the rectangular box 406, and the "Security" menu item into the third line of the menu region 405. Step 424 shows a transitory screen display where the "Sounds" menu item is being moved out the rectangular box 406, while the "Display" menu item is being moved into the rectangular box 406.

Step 426 shows a screen display where the "Sounds" menu item is displayed in the first line of the menu region 405, the "Display" menu item in the rectangular box 406, and the "Security" menu item in the third line of the menu region 405.

At step 428, to select "Sounds" menu item, a user turns-clown the jog dial wheel 108 on the control panel 106. In response, the control panel 106 sends a request to the processor 204 via the I/O interface circuit 205. In response to the request, the processor 204 scrolls the "Sounds" menu item into the rectangular box 405. Step 428 shows a transitory screen display where the "Display" menu item is being moved out of the rectangular box 405, while the "Sounds" menu item is being moved into the rectangular box 405.

Step 430 shows a screen display where the "Sounds" menu item is moved into the rectangular box 406.

At step 432, to activate "Sounds" menu item, a user presses-in the jog dial wheel 108 on the control panel 106. In response, the control panel 106 sends a request to the processor 204 via the I/O interface circuit 205. In response to the request, the processor 204 executes the display routine to invert the menu item (Sounds and its associated icon) in the rectangular box 406, so that the menu item in the rectangular box 406 is displayed as a hollow letters over a solid (e.g. highlighted) background. At the same time, the processor 204 executes the display routine to erase the other text in the menu region 405.

At steps 434 and 436, the processor 204 executes the display routine to continuously move the menu item (Sounds and its respective icon) in the rectangular box 406 upwards to the title region 404.

At step 438, the processor 204 moves the "Sounds" menu item in the rectangular box 406 to the title region 404 and maintains the "Sounds" menu item in the title region 404.

At steps 440–444, the processor 204 executes the display routine to scroll a sound sub menu 407 downwards into the menu region 405. As shown in step 444, the sound sub menu 407 contains two menu items, namely, "Ringer Volume" and "Key Volume". The triangle 409 indicates that the Ringer Volume menu item is selected.

At step 446, to activate the Ringer Volume menu item, a user presses-in the jog dial wheel 108 on the control panel 106. In response, the control panel 106 sends a request to the processor 204 via the I/O interface circuit 205. In response to the request, the processor 204 executes the display routine to invert the "Ringer Volume" menu item, so that the text of the "Ringer Volume" menu item is displayed as hollow letters over a solid (e.g. highlighted) background.

At step 448, the processor 204 executes the display routine to continuously move the Ringer Volume menu item upwards to the title region 404.

At step 450, the processor 204 moves the "Ringer Volume" menu item to the title region 404 and maintains the "Ringer Volume" menu item in the region 404. It should be appreciated that while the "Sounds" menu item in the title region 404 is replaced by "Ringer Volume" menu item, the icon associated with the "Sounds" menu item still remains in the region 404. This icon reminds a user that all subsequent menu selections relate to the "Sounds" menu.

At steps 452–456, the processor 204 executes the display routine to move a Ringer Volume sub menu 411 downwards into the menu region 405.

As shown in step 456, the Ringer Volume sub menu 411 includes two choices, namely "High" and "Med". The triangle 413 indicates that the "High" menu item is selected. To activate the "High" menu item, a user presses-in the jog dial wheel 108 on the control panel 106. In response, the control panel sends a request to the processor 204 via the I/O interface circuit 205. In response to the request, the processor 204 executes the sound setting routine (stored in the application memory 220) to set the ringer volume for the cellular telephone 100.

Figure 5:
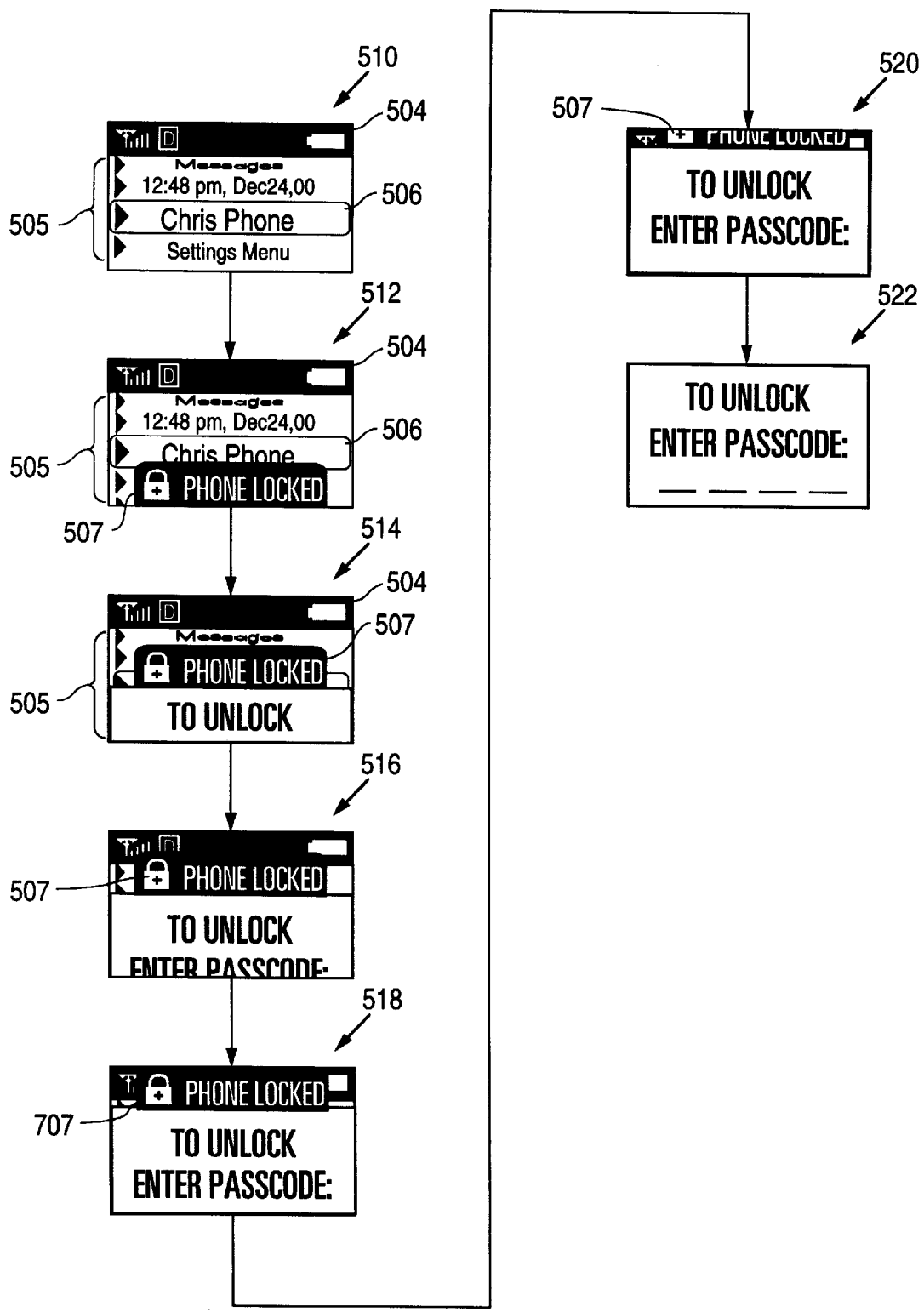
FIG. 5 shows the steps of animation transition effects for a message tab on a display region, in accordance with another embodiment of the present invention.

Referring to FIG. 5, there is shown the steps of illustrating animation transition effects for a message tab on the display region 112, in accordance with another embodiment of the present invention.

At step 510, the processor 204 executes the display routine to display a user main menu. As shown in step 510, the main user menu contains a title region 504 at the top of the main user menu and a menu region 505 having a rectangular box 506 in the middle of the menu region 505.

At step 512, when a user sets the cellular telephone 100 to lock, the processor 204 executes the display routine (stored in the application memory 220) to display the message tab 507 on the main user menu. Visually, the message tab 507 is one layer above the screen display shown at step 510. The message tab 507 covers the bottom portion of the main user menu, but leaves the important message, such as the time and date, on the main user menu visible.

At step 514, the tab 507 is invoked, when a user attempts to use the cellular telephone 100, either via the jog dial wheel 108 or the key panel 110, In response, the processor 204 executes the display routine to gradually move the message tab 507 upwards, so that the message contained in the message tab 507 can be displayed.

At steps 516–520, the processor 204 executes the display routine to continuously move the message tab 507 upwards, so that the message contained in the message tab 507 can be fully displayed.

At step 522, the processor 204 displays the message over the whole display screen, showing the warning message and prompting the user to enter the unlock code. Upon receiving a correct unlock code, the animation sequence reverses and the message tab 507 goes away.

Although the present invention has been shown and described with respect to preferred embodiments, various changes and modifications are deemed to lie within the spirit and scope of the invention as claimed.

What is claimed is:

1. A method comprising the steps of:
   displaying a screen having a menu title region and a display region;
   displaying at least one menu item in the display region, the menu item being associated with a plurality of sub menu items;
   activating the menu item;
   automatically and continuously scrolling the activated menu item to the menu title region upon activation of the menu item; and
   automatically and continuously scrolling the sub menu items into the display region while the activated menu item is being automatically scrolled toward the menu title region.

2. The method of claim 1,
   wherein the menu title region is located on a top position of the screen; and
   wherein the sub menu items are automatically scrolled one item by one item into the display region from a bottom position of the screen.

3. The method of claim 1,
   wherein the menu title region is located on a top position of the screen; and
   wherein the sub menu items are automatically scrolled one item by one item into the display region from the top position of the screen.

4. The method of claim 1, wherein the display region contains a plurality of menu items, the method further comprising the step of:
   erasing other menu items that are not activated from the display region.

5. The method of claim 4, further comprising the step of:
   inverting a display pattern for the activated menu item before moving the activated menu item.

6. A method comprising the steps of:
   displaying a screen having a menu title region and a display region;
   displaying in the display region a first level menu associated with a plurality of first level menu items;
   displaying an associated icon beside each of the first level menu items;
   activating one of the plurality of first level menu items, the activated first level menu item being associated with at least one second level menu item;
   automatically and continuously scrolling the activated first level menu item and an icon associated with the activated first menu item to the menu title region;
   automatically and continuously scrolling the at least one second level menu item associated with the activated first level menu item into the display region while the activated first level menu item is automatically scrolled toward the menu title region.

7. The method of claim 6,
   wherein the menu title region is located on a top position of the screen; and
   wherein the at least one second level menu item associated with the activated first level menu item is automatically scrolled from the top position into the display region.

8. The method of claim 6, further comprising the step of:
   erasing other first level menu items that are not activated from the display region.

9. The method of claim 8, further comprising the step of:
   inverting the display pattern for the activated first level menu item before automatically scrolling the activated first level menu item.

10. A method for displaying a tag containing a tag head and a message, comprising the steps of:
    displaying a screen;
    displaying the tag head in the screen;
    activating the tag;
    automatically and continuously scrolling the tag head to a top position of the screen upon activation of the tag; and
    automatically and continuously scrolling the message into the screen while the tag head is automatically scrolled towards the top position of the screen.

11. The method of claim 10, further comprising the step of:
    displaying a user message on the screen;
    wherein the tag covers a portion of the user message.

12. The method of claim 11, wherein the user message is a user menu.

13. The method of claim 10, wherein the tag head is gradually scrolled out of the screen while the message is automatically scrolled into the whole screen.

14. The method of claim 13, further comprising the step of:
    erasing the message from the screen; and
    re-displaying the menu on the screen.

15. An apparatus comprising:
    means for displaying a screen having a menu title region and a display region;
    means for displaying at least one menu item in the display region, the menu item being associated with a plurality of sub menu items;
    means for activating the menu item;
    means for automatically and continuously scrolling the activated menu item to the menu title region upon activation of the menu item; and
    means for automatically and continuously scrolling the sub menu items into the display region while the activated menu item is automatically scrolled toward the menu title region.

16. The apparatus of claim 15,
    wherein the menu title region is located on a top position of the screen; and
    wherein the sub menu items are automatically scrolled one item by one item into the display region from a bottom position of the screen.

17. The apparatus of claim 15,
    wherein the menu title region is located on a top position of the screen; and
    wherein the sub menu items are automatically scrolled one item by one item into the display region from the top position of the screen.

18. The apparatus of claim 15, wherein the display region contains a plurality of menu items, the apparatus further comprising:
    means for erasing other menu items that are not activated from the display region.

19. The apparatus of claim 15, further comprising:
    means for inverting a display pattern for the activated menu item before scrolling the activated menu item.

20. A apparatus comprising:

means for displaying a screen having a menu title region and a display region;

means for displaying in the display region a first level menu associated with a plurality of first level menu items;

means for displaying an associated icon beside each of the first level menu items;

means for activating one of the first level menu items, the activated first level menu item being associated with at least one second level menu item;

means for automatically and continuously scrolling the activated first level menu item and an icon associated with the activated first level menu item to the menu title region;

means for automatically and continuously scrolling the second level menu item associated with the activated first level menu item into the display region while the activated first level menu item is automatically scrolled toward the menu title region.

21. The apparatus of claim 20, wherein the menu title region is located on a top position of the screen; and wherein the second level menu item associated with the activated first level menu item is automatically scrolled from the top position into the display region.

22. The apparatus of claim 20, further comprising:

means for erasing other first level menu items that are not activated from the display region.

23. The apparatus of claim 20, further comprising:

means for inverting the display pattern for the activated first level menu item before scrolling the activated first level menu item.

24. An apparatus for displaying a tag containing a tag head and a message, comprising:

means for displaying a screen;

means for displaying the tag head in the screen;

means for activating the tag;

means for automatically and continuously scrolling the tag head to a top position of the screen upon activation of the tag; and means for automatically and continuously scrolling the message into the screen while the tag head is automatically scrolled towards the top position of the screen.

25. The apparatus of claim 24, further comprising:

means for displaying a user message on the screen;

wherein the tag covers a portion of the user message.

26. The apparatus of claim 25, wherein the user message is contained in a user menu.

27. The apparatus of claim 24, wherein the tag head is gradually, automatically scrolled out of the screen while the message is automatically scrolled into the whole screen.

28. The apparatus of claim 27, further comprising:

means for erasing the message from the screen; and means for re-displaying the menu on the screen.

29. A method comprising the steps of:

displaying a screen having a menu title region and a display region;

displaying in the display region a first level menu associated with a plurality of first level menu items;

displaying an associated icon beside each of the first level menu items;

activating one of the first level menu item, the activated first level menu item being associated with at least one second level menu item;

continuously moving the activated first level menu item and an icon associated with the activated first menu item to the menu title region;

continuously moving the at least one second level menu item associated with the activated first level menu item into the display region while the activated first level menu item is being moved toward the menu title region;

activating the at least one second level menu item, the activated second level menu item being associated with at least one third level menu item;

continuously moving the activated second level menu item to the menu title region to replace the first level menu item previously displayed in the menu title region;

keeping the icon associated with the first level menu item in the menu title region; and continuously moving the at least one third level menu item into the display region, upon movement of the activated second level menu item into the menu title region.

30. A apparatus comprising:

means for displaying a screen having a menu title region and a display region;

means for displaying in the display region a first level menu associated with a plurality of first level menu items;

means for displaying an associated icon beside each of the first level menu items;

means for activating one of the plurality of first level menu items, the activated first level menu item being associated with at least one second level menu item;

means for continuously moving the activated first level menu item and an icon associated with the activated first menu item to the menu title region;

means for continuously moving the at least one second level menu item associated with the activated first level menu item into the display region while the activated first level menu item is being moved toward the menu title region;

means for activating the at least one second level menu item, the activated second level menu item being associated with at least one third level menu item;

means for continuously moving the activated second level menu item to the menu title region to replace the first level menu item previously displayed in the menu title region;

means for keeping the icon associated with the first level menu item in the menu title region; and means for continuously moving the at least one third level menu item into the display region, upon movement of the activated second level menu item into the menu title region.

* * * * *

UNITED STATES PATENT AND TRADEMARK OFFICE
CERTIFICATE OF CORRECTION

PATENT NO. : 6,049,336
DATED : April 11, 2000
INVENTOR(S) : Liu et al.

It is certified that error appears in the above-identified patent and that said Letters Patent is hereby corrected as shown below:

In column 3, line 14, delete "i" at the end of the line and insert therefor -- a --.

In column 4, line 19, delete "comprise" and insert therefor -- comprised --.

Signed and Sealed this

Eighth Day of May, 2001

Attest:

NICHOLAS P. GODICI

Attesting Officer    Acting Director of the United States Patent and Trademark Office